(12) United States Patent
Guard

(10) Patent No.: US 6,439,165 B1
(45) Date of Patent: Aug. 27, 2002

(54) PORTABLE ANIMAL SHELTER

(75) Inventor: Tony Michael Guard, Union, KY (US)

(73) Assignee: Gravity, Incorporated, Cincinnati, OH (US)

( * ) Notice: Subject to any disclaimer, the term of this patent is extended or adjusted under 35 U.S.C. 154(b) by 0 days.

(21) Appl. No.: 09/526,823

(22) Filed: Mar. 16, 2000

(51) Int. Cl.⁷ .................................................. A01K 1/02
(52) U.S. Cl. ........................................................ 119/496
(58) Field of Search ................................ 119/482, 498, 119/28.5, 61

(56) References Cited

U.S. PATENT DOCUMENTS

| | | | | |
|---|---|---|---|---|
| 3,125,663 A | * | 3/1964 | Hoffman | |
| 4,729,343 A | * | 3/1988 | Evans | 119/19 |
| 4,827,872 A | * | 5/1989 | Sommers | 119/19 |
| 5,283,962 A | | 2/1994 | Humann | 34/202 |
| 5,311,837 A | * | 5/1994 | Mamer-Boellstorff | 119/28.5 |
| 5,357,901 A | * | 10/1994 | Batts | 119/28.5 |
| 5,371,340 A | * | 12/1994 | Stanfield | 119/28.5 |
| 5,551,371 A | * | 9/1996 | Markley et al. | 119/499 |
| 6,189,487 B1 | * | 2/2001 | Owen et al. | 119/28.5 |

* cited by examiner

Primary Examiner—Thomas Price
(74) Attorney, Agent, or Firm—Haverstock, Garrett & Roberts LLP

(57) ABSTRACT

The portable animal shelter includes a platform having an upper surface on which the animal can sit or lie, and at least one receptacle on or in the upper surface adapted for receiving a heat transfer medium adapted for cooling or warming the animal. In another aspect of the invention, the portable animal shelter includes the platform, and a canopy positionable over at least a portion of the upper surface defining an at least partially enclosed space for receiving the animal.

26 Claims, 3 Drawing Sheets

PORTABLE ANIMAL SHELTER

TECHNICAL FIELD

This invention relates generally to portable shelters for animals such as canines, felines, humans, and the like, and more particularly, to a portable animal shelter on which the animal can rest out of contact with the ground or other surface on which the shelter is located, and which provides a heat transfer medium for cooling or warming the animal, and/or a canopy at least partially enclosing a space for receiving the animal for protecting the animal from the sun, wind and other environmental elements.

BACKGROUND ART

Often, at locations such as the home, the beach, or when boating or attending events such as concerts, festivals, sporting events, and the like, animals, including, but not limited to, pets such as dogs and cats, and small children and infants, can be subject to environmental conditions which are particularly adverse to them. For instance, environmental factors such as heat and drying wind can dehydrate and/or burn the skin of an animal, while the cold can cause chills and more serious injuries such as frostbite and the like.

To avoid such adverse circumstances, animal owners and parents often forego an activity where such environmental elements are present, leave early, or make other arrangements for the child or pet. Protective garments, umbrellas and the like provide some protection from certain environmental elements, but not heat generally. Umbrellas are also not particularly effective against wind. Protective garments may also be restrictive, and are not generally a good solution for pets for obvious reasons. Other alternatives, such as travel kennels and the like, are not desirable solutions as they are bulky and cumbersome, and are generally hot.

Accordingly, the present invention is directed to overcoming one or more of the problems as set forth above.

DISCLOSURE OF THE INVENTION

In one aspect of the present invention, a portable animal shelter is disclosed, the shelter including a portable platform or base including an upper surface on which the animal can sit or lie, and at least one receptacle on or in the upper surface adapted for receiving a heat transfer medium such as, but not limited to, a hot pack or a cold pack, for cooling or warming the animal, so as to provide a more temperate and comfortable place for the animal. The upper surface of the platform preferably includes a mat or layer of a comfort enhancing material which is preferably removable and replaceable for cleaning or the like. The receptacle or receptacles for receiving the heat transfer medium can be incorporated into the platform or the mat or layer of the comfort enhancing material, and can encompass all or only a portion of the area of the upper surface of the platform, such as for warming or cooling specific portions of the animal's anatomy, as desired.

In another aspect of the invention, the portable animal shelter includes a canopy positionable over at least a portion of the upper surface of the platform defining an at least partially enclosed space for receiving the animal for protecting the animal from adverse environmental elements such as light and/or wind and increasing the animal's comfort and security.

BEST MODE FOR CARRYING OUT THE INVENTION

Figure 1:
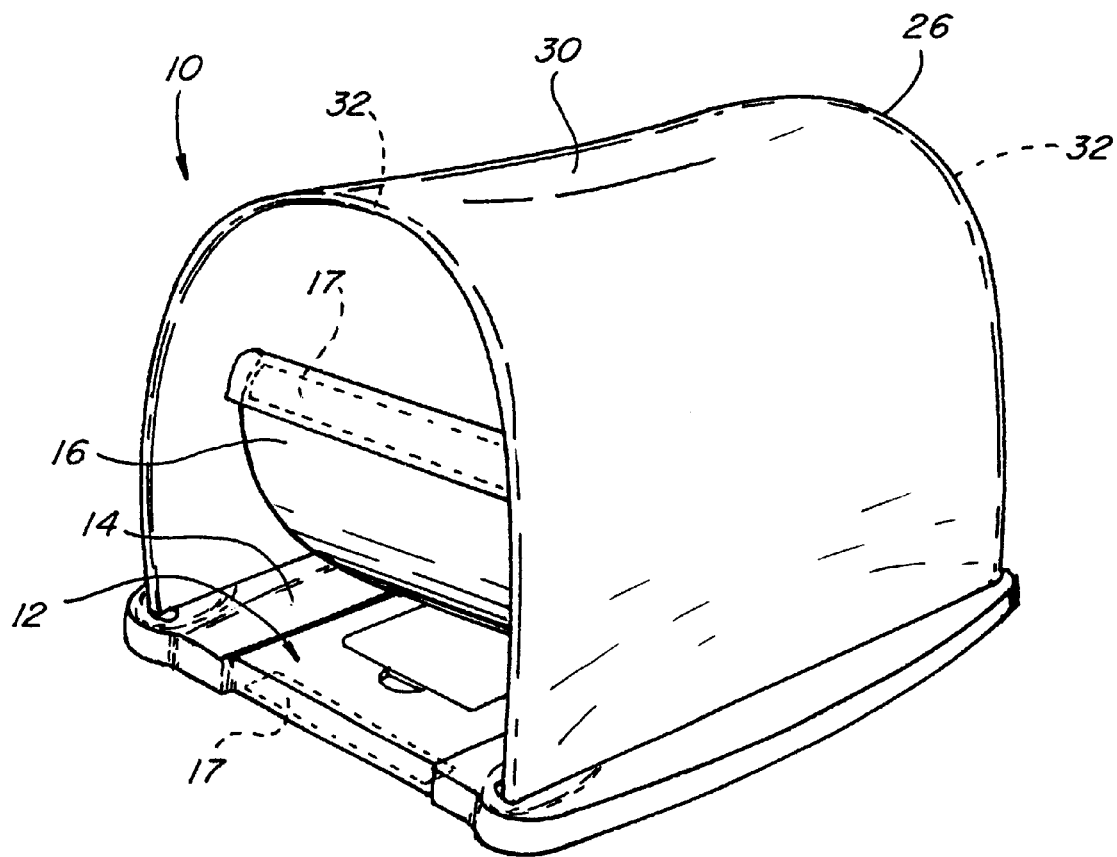
FIG. 1 is a perspective view of a portable animal shelter according to the present invention.

Referring now to the drawings, in FIG. 1 a portable animal shelter 10 constructed and operable according to the present invention is shown. Animal shelter 10 includes a portable platform 12 including a generally planar upper surface 14 on which an animal can a sit or lie. A mat or layer of a comfort enhancing material 16, such as, but not limited to, a carpet, canvas or cloth, of, for instance, a woven or non-woven construction, is removably attached to upper surface 14. Comfort enhancing material 16 can be merely laid on upper surface 14, or can be attached to platform 12 in any desired conventional manner, such as by using hook and loop type fasteners 17, or mechanical fasteners such as clamps or clips, adhesives, or the like (not shown), preferably to allow easy removal for cleaning and replacement.

Figure 2:
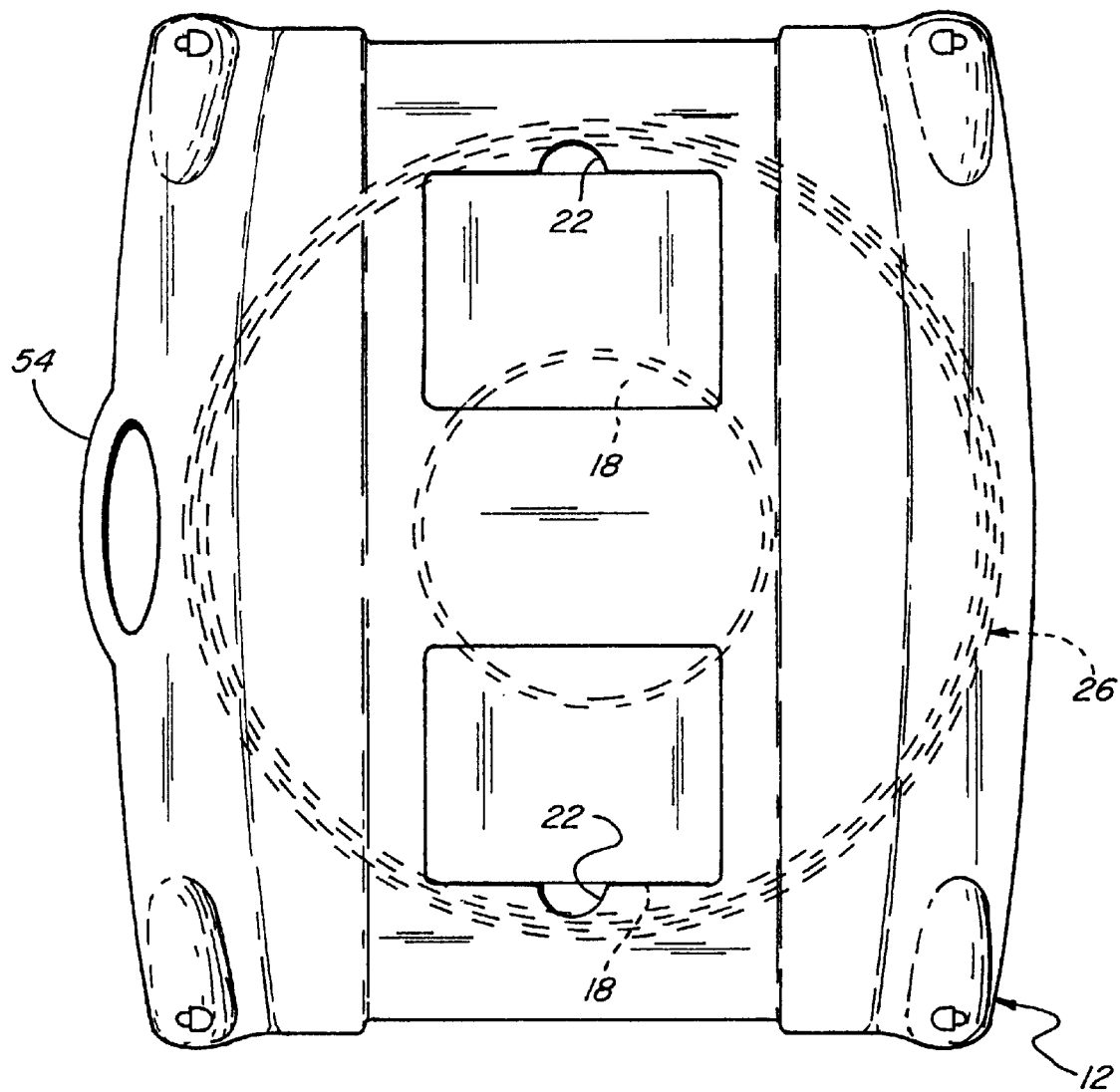
FIG. 2 is a top view of a portable platform of the animal shelter of FIG. 1.
Figure 3:
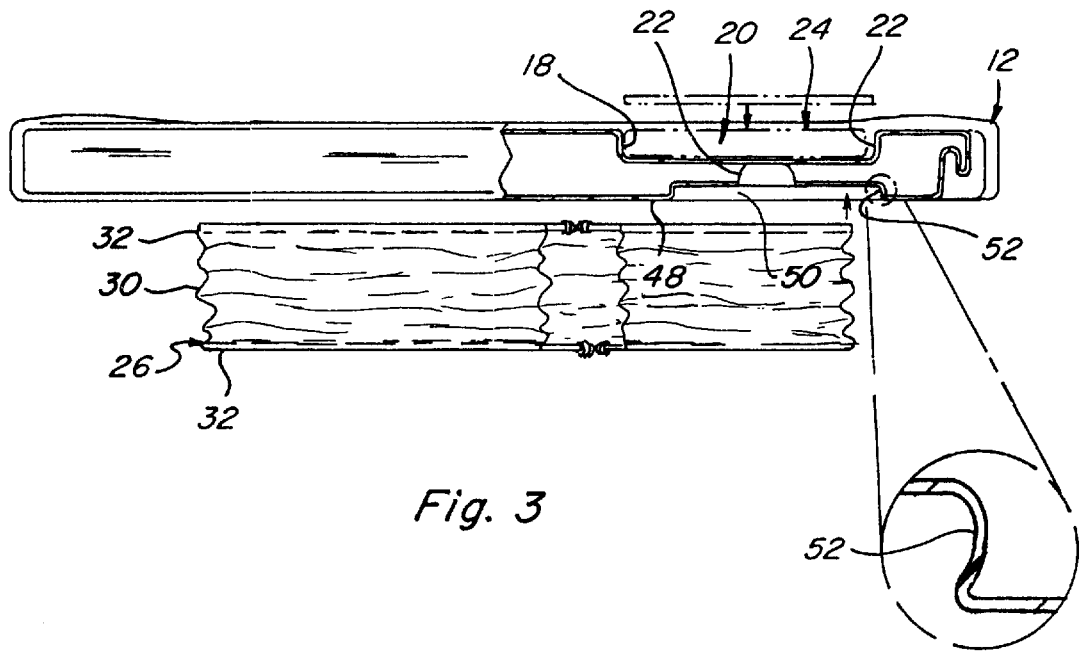
FIG. 3 is a side view of the platform in partial cross-section showing a canopy stored and a heat transfer medium in place in the platform.

Also referring to FIGS. 2 and 3, platform 12 is shown including two receptacles 18 beneath upper surface 14 adapted for receiving heat transfer mediums, respectively, such as hot and/or cold packs. Each receptacle 18 is shown open to upper surface 14 and including an adjacent finger hole 22 which allows lifting the heat transfer medium from the receptacle, and an additional hole 22 is provided in the bottom of each receptacle 18 for that purpose and also for drainage of condensation and other liquid from receptacles 18. Referring to FIG. 3, each receptacle 18 can additionally include an optional cover 20 positionable between comfort enhancing material 16 and the heat transfer medium located in the receptacle 18, as desired. A receptacle 18 in FIG. 3 is shown including a representative heat transfer medium 24 which is a conventional cold pack or ice pack of about the same size as the receptacle, purchasable in a wide variety of retail outlets for use in cooling food and injured body parts. Such packs are typically cooled before use in a refrigerator or other cold place, and the in present instance, can be simply and easily placed in receptacles 18 when it is desired to use shelter 10, such as in the home or during picnics, festivals, and other events. Replacement packs can be kept in a cooler or other location and then used as required to replace packs that have warmed up, to maintain platform 12 generally within a desired temperature range or otherwise comfortable for the animal.

Alternatively, when shelter 10 is to be used when ambient temperatures are cooler or the animal otherwise would be more comforted by a warmer surface on which to sit or lie, heat transfer mediums 24 which are heat releasing can be used, such as conventional, commercially available hot water bottles or containers and heat packs, any of which are also available at retail outlets. For example, each heat transfer medium 24 can include a microwave heatable element, such as a wide variety of well known materials including, but not limited to, the dry powder mixes disclosed in Salyer U.S. Pat. No. 5,211,949, issued May 18, 1993; the microwave-activated thermal storage material disclosed in Salee U.S. Pat. No. 5,424,519, issued Jun. 13, 1995; and the microwave-activated mixed-powder thermal storage material disclosed in Salee U.S. Pat. No. 5,630,961, issued May 20, 1997, which disclosures are incorporated herein by reference. Heat transfer mediums 24 can also include microwave heatable gel packs sold by Corning Ware under the trade name Pop-Ins, or those available from Thera-Med of Waco, Tex., as well as other commercially available microwave heatable products. Some of the commercially available microwave heatable products are also chillable, so as to be usable as cool packs for cooling. To provide optimal heat transfer characteristics, receptacles 18 are located close to upper surface 14 and can be used with covers 20 thereover as shown, as desired.

Here, it should be understood that the heat transfer mediums 24, whether to be used for cooling or for warming, can be brought to within any desired temperature range using conventional techniques such as by chilling in a refrigerator or cooler, by filling with chilled or heated water or another conventional substance, by heating using a conventional or microwave oven or other energy source, chemical reaction, phase change, or the like, without departing from the scope of the present invention. It should also be understood that while heat transfer mediums 24 are shown in receptacles 18 beneath upper surface 14 and comfort enhancing material 16, the receptacle or receptacles 18 can be located on or in surface 14 or the mat or layer of material 16, without departing from the scope of the present invention. The receptacle or receptacles 18 can also be of any desired size, for instance large enough to encompass substantially all of the surface area of upper surface 14, or smaller such as shown, for instance, so as to be located under specific portions of the animal's anatomy.

Shelter 10 is additionally shown with a canopy 26 positionable in covering relation to a substantial portion of upper surface 14 of portable platform 12, to define and partially enclose a space 28 for receiving the animal. Canopy 26 has a rounded or curved cross-sectional shape and extends substantially the length of platform 12. Canopy 26 includes a cover 30 of a thin, flexible material, such as a canvas fabric or plastics film. The outer surface of cover 30 can be a light color, such as a tan or white color, so as to be at least partially light reflective, or can be coated with or covered with a layer of a medium having a light reflective property, so as to limit or reduce heat buildup within space 28 due to exposure of canopy 26 to sunlight. Canopy 26 or platform 12 can be oriented to provide protection from wind if desired, or can be oriented so as to allow wind to enter the open end thereof to enhance cooling, as desired. Cover 30 of canopy 26 is preferably supported at the opposite ends thereof by resiliently flexible or bendable support rods 32 which can be suitably attached to cover 30 such as by passage through looped ends thereof, rods 32 having opposite ends 34 cooperatively receivable in and engageable with rod receptacles 36 of platform 12 using any suitable structure, such as that illustrated in FIGS. 4 and 5.

Figure 4:
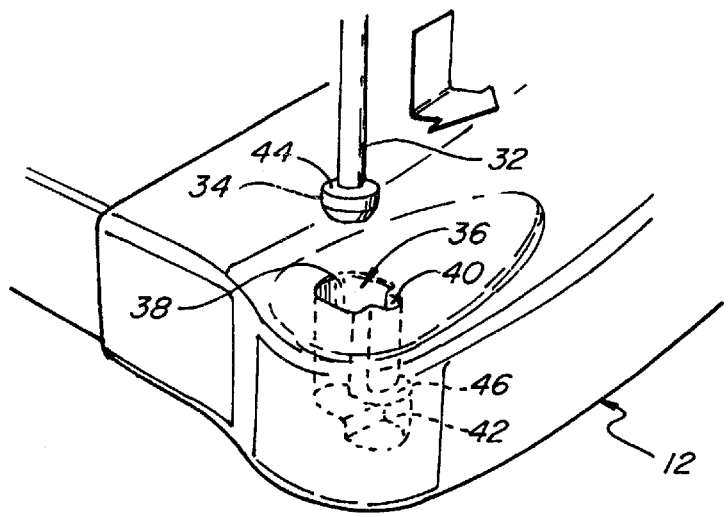
FIG. 4 is a perspective view showing installation of the canopy onto the portable platform.
Figure 5:
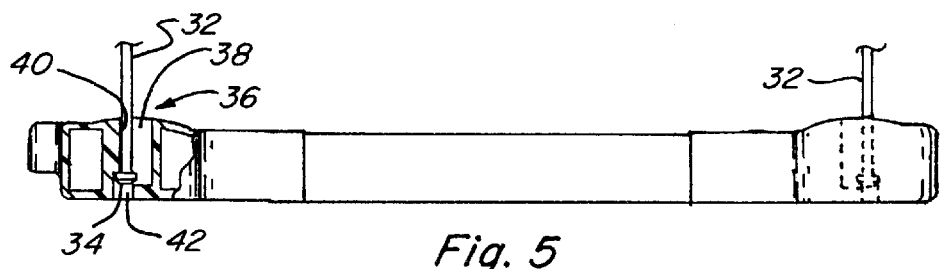
FIG. 5 is a fragmentary front view of the platform showing a rod of the canopy received in a receptacle of the platform.

Referring more particularly to FIGS. 4 and 5, each end 34 of rods 32 is enlarged relative to the rod itself, and is receivable in a main passage 38 of the receptacle. Rods 32 are generally straight in an unbiased normal state and must be resiliently bent or flexed as shown for placement of ends 34 into receptacles 36. Receptacles 36 each include a channel 40 along one side of an upper portion of stepped passage 38 adapted for receiving a segment of the rod 32, the receptacle 36 including a lower cavity 42 which extends downwardly from passage 38 and is adapted for receiving and holding end 34 with a shoulder 44 thereof in abutment with a lip 46 disposed between passage 38 and lower cavity 42.

Canopy 26 is easily attachable to platform 12 by grasping the rods 32 and resiliently bending them into a curved shape and inserting ends 34 thereof into main passages 38 of receptacles 36 until the ends strike the bottom of passages 38. Then, rods 32 are merely released such that the tension therein due to bending into the curved shape shown will urge ends 34 outwardly into lower cavities 42 to engage shoulders 44 with lips 46. An adjacent portion of the rods 32 are received in channels 40 when the rods are released and are maintained in position by the resilient tension due to the bending in an upright position relative to upper surface 14 of platform 12 for holding cover 30 as shown in FIG. 1. For removal of canopy 26 from platform 12, rods 32 are flexed inwardly to withdraw the rods from channels 40 and ends 34 from lower cavities 42, and the ends are withdrawn from main passages 38. When canopy 26 is removed from platform 12, cover 30 can be collapsed and folded between and/or wrapped around rods 32 and the rods flexed into a circular shape. Platform 12 includes a bottom surface 48 having a circular recess 50 therein, adapted for receiving canopy 26 when in the circular shape for stowage (FIG. 2), the canopy being retained in recess 50 by engagement of rods 32 with an outer circumferential lip 52 around recess 50 or any other suitable retainer element. With canopy 26 suitably stowed on platform 12, shelter 10 is compact and easy to carry.

To enable even easier carrying of shelter 10, platform 12 can include a handle 54 at a convenient location, such as along one side, as shown in FIG. 2. Platform 12 can be manufactured in any suitable conventional manner using a wide variety of conventional materials, such as a plastics material which can be injection molded, vacuum formed, rotationally molded, or the like. Also, although only one arrangement of receptacles 18 for receiving heat transfer mediums 24 is shown, it should be understood that various other arrangements, including fewer or a greater number of receptacles can be utilized, as desired, without departing from the scope of the present invention. Similarly, platform 12 and canopy 26 can have a variety of different shapes and sizes, in addition to that shown without departing from the present invention.

From the foregoing discussion, it should be apparent that the shelter according to the present invention has utility for providing comfort and protection from a wide variety of environmental conditions, or to just provide a comfortable, warm or cool place to sit or lie, at any desired location, including, but not limited to, the home, workplace, outdoors, and the like.

Thus, there has been shown and described a novel invention in a portable animal shelter which overcomes many of the problems set forth above. It will be apparent, however, to those familiar in the art, that many changes, variations, modifications, and other uses and applications for the subject device are possible. All such changes, variations, modifications, and other uses and applications that do not depart from the spirit and scope of the invention are deemed to be covered by the invention which is limited only by the claims which follow.

What is claimed is:

1. A portable animal shelter, comprising:
  a portable platform including an upper surface on which the animal can sit or lie. a canopy positionable over at least a portion of the upper surface of the portable platform for defining an at least partially enclosed space for receiving the animal; and
  at least one receptacle on or in the upper surface adapted for receiving a heat transfer medium for cooling or warming the animal.

2. The portable animal shelter of claim 1, wherein the heat transfer medium comprises a heat releasing substance.

3. The portable animal shelter of claim 2, wherein the heat releasing substance comprises a microwave heatable element.

4. The portable animal shelter of claim 1, wherein the heat transfer medium comprises a heat absorbing substance.

5. The portable animal shelter of claim 4, wherein the heat absorbing substance comprises a chillable substance.

6. The portable animal shelter of claim 1. wherein the canopy comprises rods cooperatively engageable with the portable platform for extending upwardly from the upper surface thereof, and a film or fabric extending between and supported by the rods.

7. The portable animal shelter of claim 6, wherein the rods include ends cooperatively receivable in receptacles in the portable platform.

8. The portable animal shelter of claim 1, wherein the canopy is detachable from the portable platform and is stowable in a collapsed or folded state on the platform.

9. The portable animal shelter of claim 8, wherein the platform includes a bottom surface opposite the upper surface including a receptacle for receiving the canopy when in the collapsed state.

10. The portable animal shelter of claim 1, wherein the canopy is at least partially light reflective.

11. The portable animal shelter of claim 1, further comprising a mat or layer of a comfort enhancing material on the upper surface of the platform.

12. A portable animal shelter comprising:
    a portable platform including an upper surface on which the animal can sit or lie. the platform including a receptacle containing a removable heat transfer medium hotter or colder than the platform for warming or cooling the upper surface; and
    a canopy positionable over at least a portion of the upper surface of the portable platform for defining an at least partially enclosed space for receiving the animal.

13. The portable animal shelter of claim wherein the receptacle is on or in the upper surface.

14. The portable animal shelter of claim 13, wherein the heat transfer medium comprises a heat releasing substance.

15. The portable animal shelter of claim 14, wherein the heat releasing substance comprises a microwave heatable element.

16. The portable animal shelter of claim 13, wherein the heat transfer medium comprises a heat absorbing substance.

17. The portable animal shelter of claim 16, wherein the heat absorbing substance comprises a chillable substance.

18. The portable animal shelter of claim 12, wherein the canopy includes at least one support rod attachable to the portable platform for holding the canopy in an upright position.

19. The portable animal shelter of claim 18, wherein the canopy is stowable in a collapsed state on the platform.

20. The portable animal shelter of claim 12, wherein the canopy is at least partially light reflective.

21. The portable animal shelter of claim 12, further comprising a layer of a comfort enhancing material on the upper surface of the platform.

22. A portable animal shelter comprising a portable platform including an upper surface on which the animal can sit or lie; and
    a canopy positionable over at least a portion of the upper surface of the portable platform for defining an at least partially enclosed space for receiving the animal, the canopy including at least one support rod attachable to the portable platform for holding the canopy in an upright position.

23. The portable animal shelter of claim 22, wherein the canopy is stowable in a collapsed state on the platform.

24. A portable animal shelter, comprising:
    a portable platform including an upper surface on which the animal can sit or lie;
    at least one receptacle on or in the upper surface adapted for receiving a heat transfer medium for cooling or warming the animal; and
    a canopy attachable on the portable platform in spaced relation above at least a portion of the upper surface, the canopy being detachable from the portable platform and being stowable in a collapsed or folded state on the platform.

25. The portable animal shelter of claim 24, wherein the platform includes a bottom surface opposite the upper surface including a receptacle for receiving the canopy when in the collapsed state.

26. A portable animal cooling device comprising:
    a portable platform including an upper surface on which the animal can sit or lie; and
    at least one receptacle on or in the upper surface adapted for removably receiving a cold pack colder than the platform for cooling the animal and a cover over the at least one receptacle in position to be disposed between the cold pack and an animal sitting or lying on the upper surface.

* * * * *